US009586487B2

(12) United States Patent
Knechtges (10) Patent No.: US 9,586,487 B2
(45) Date of Patent: Mar. 7, 2017

(54) ELECTROHYDRAULIC MOTOR VEHICLE BRAKE SYSTEM AND METHOD FOR OPERATING THE SAME

(71) Applicant: Lucas Automotive GmbH, Koblenz (DE)

(72) Inventor: Josef Knechtges, Mayen (DE)

(73) Assignee: Lucas Automotive GmbH, Koblenz (DE)

( * ) Notice: Subject to any disclaimer, the term of this patent is extended or adjusted under 35 U.S.C. 154(b) by 85 days.

(21) Appl. No.: 14/654,636

(22) PCT Filed: Nov. 28, 2013

(86) PCT No.: PCT/EP2013/074916
§ 371 (c)(1),
(2) Date: Jun. 22, 2015

(87) PCT Pub. No.: WO2014/095282
PCT Pub. Date: Jun. 26, 2014

(65) Prior Publication Data
US 2015/0343905 A1 Dec. 3, 2015

(30) Foreign Application Priority Data

Dec. 21, 2012 (DE) .................. 10 2012 025 290

(51) Int. Cl.
*B60L 7/26* (2006.01)
*B60T 8/17* (2006.01)
(Continued)

(52) U.S. Cl.
CPC ........ *B60L 7/26* (2013.01); *B60L 7/18* (2013.01); *B60T 7/042* (2013.01); *B60T 8/17* (2013.01);
(Continued)

(58) Field of Classification Search
CPC .......... B60T 7/042; B60T 8/17; B60T 8/4077; B60T 13/686; B60T 13/745; B60L 7/18
(Continued)

(56) References Cited

U.S. PATENT DOCUMENTS 8,726,654 B2 5/2014 Cagnac et al.
9,227,611 B2 * 1/2016 Gilles .................. B60T 8/3275
(Continued)

FOREIGN PATENT DOCUMENTS

DE 10338046 A1 3/2005
DE 102006055799 A1 5/2008
(Continued)

*Primary Examiner* — Anna Momper
(74) *Attorney, Agent, or Firm* — MacMillan, Sobanski & Todd, LLC (57) ABSTRACT

The invention relates to a technique for operating a regenerative electrohydraulic motor vehicle brake system comprising a master cylinder that can be supplied with a hydraulic fluid from a reservoir, an electromechanical actuator for actuating a piston accommodated in the master cylinder and a stop valve provided between the master cylinder and the reservoir. According to an aspect of this technique, the method comprises the step of controlling the electromechanical actuator when the stop valve is closed to generate a hydraulic pressure on a wheel brake that is fluidically connected to the master cylinder. The method further comprises the step of activating a regenerative brake operation and of controlling the stop valve to open, the master cylinder remaining fluidically connected to the wheel brake and the electromechanical actuator being controlled to maintain the hydraulic pressure on the wheel brake at least to some extent.

17 Claims, 6 Drawing Sheets

(51) Int. Cl.
- *B60T 13/66* (2006.01)
- *B60L 7/18* (2006.01)
- *B60T 7/04* (2006.01)
- *B60T 8/40* (2006.01)
- *B60T 13/68* (2006.01)
- *B60T 13/74* (2006.01)

(52) U.S. Cl.
CPC .......... *B60T 8/4077* (2013.01); *B60T 13/662* (2013.01); *B60T 13/686* (2013.01); *B60T 13/745* (2013.01)

(58) Field of Classification Search
IPC .................... B60T 7/042,8/17, 8/4077, 13/686, 13/745
See application file for complete search history.

(56) References Cited

U.S. PATENT DOCUMENTS

| | | | | |
|---|---|---|---|---|
| 2004/0227396 | A1* | 11/2004 | Kusano | B60T 8/3655 303/113.1 |
| 2011/0115282 | A1* | 5/2011 | Dinkel | B60T 7/042 303/3 |
| 2011/0291470 | A1 | 12/2011 | Drumm | |
| 2013/0199364 | A1 | 8/2013 | Weiberle et al. | |
| 2013/0234501 | A1 | 9/2013 | Leiber | |
| 2013/0298550 | A1* | 11/2013 | Leiber | B60T 7/042 60/545 |
| 2014/0197680 | A1 | 7/2014 | Gilles | |

FOREIGN PATENT DOCUMENTS

| | | |
|---|---|---|
| DE | 102009005937 A1 | 7/2010 |
| DE | 102009054985 A1 | 1/2011 |
| DE | 102009043484 A1 | 3/2011 |
| DE | 102010039345 A1 | 2/2012 |
| DE | 102010042694 A1 | 2/2012 |
| DE | 102010055044 A1 | 5/2012 |
| DE | 102011101066 A1 | 11/2012 |
| EP | 2399792 A2 | 12/2011 |
| WO | 2006111393 A1 | 10/2006 |
| WO | 2007025584 A1 | 3/2007 |
| WO | 2010006998 A2 | 1/2010 |
| WO | 2010091883 A1 | 8/2010 |
| WO | 2011141158 A2 | 11/2011 |
| WO | 2012152352 A1 | 11/2012 |

* cited by examiner

ELECTROHYDRAULIC MOTOR VEHICLE BRAKE SYSTEM AND METHOD FOR OPERATING THE SAME

CROSS-REFERENCE TO RELATED APPLICATIONS

This application is a national stage of International Application No. PCT/EP2013/074916 filed Nov. 28, 2013, and which claims priority to German Patent Application No. 10 2012 025 290.0 filed Dec. 21, 2012, the disclosures of which are incorporated herein by reference in their entirety.

BACKGROUND OF THE INVENTION

The present disclosure relates generally to the field of vehicle brake systems. Concretely, an electrohydraulic vehicle brake system with an electromechanical actuator for actuating the brake system is described.

Electromechanical actuators have already been used for some time in vehicle brake systems, for example, for realising an electrical parking brake function (EPB). In the case of electromechanical brake systems (EMB), they replace the conventional hydraulic cylinders at the wheel brakes.

Owing to technical advances, the efficiency of the electromechanical actuators has continually increased. It was therefore considered to use such actuators also for implementing modern driving dynamics control systems. Such control systems include an antilock braking system (ABS), a traction control system (TCS) or an electronic stability program (ESP), also referred to as vehicle stability control (VSC).

WO 2006/111393 A, and corresponding to U.S. Pat. No. 8,540,324 B2, teaches an electrohydraulic brake system having a highly dynamic electromechanical actuator which performs the pressure modulation in the driving dynamics control operation. The electromechanical actuator described in WO 2006/111393 A is provided to act directly on a master cylinder of the brake system. Owing to the high dynamics of the electromechanical actuator, the hydraulic components of the brake system known from WO 2006/111393 A can be reduced to a single 2/2-way valve per wheel brake. To realise wheel-individual pressure modulations, the valves are then actuated individually or in groups in multiplex operation.

However, the minimising to only one valve per wheel brake also results in challenges, such as an undesired pressure equalisation when valves are opened simultaneously. A solution based on a highly dynamic control behaviour is specified for this in WO 2010/091883 A, and corresponding to US Patent Publication No. 2012/013173 A1.

WO 2010/091883 A discloses an electrohydraulic brake system having a master cylinder and a tandem piston accommodated therein. The tandem piston is actuable by means of an electromechanical actuator. The electromechanical actuator comprises an electric motor arranged concentrically with respect to the tandem piston, as well as a transmission arrangement which converts a rotational movement of the electric motor into a translational movement of the piston. The transmission arrangement is composed of a ball screw drive having a ball screw nut coupled in a rotationally fixed manner to a rotor of the electric motor and a ball screw spindle acting on the tandem piston.

A further electrohydraulic brake system having an electromechanical actuator acting on a master cylinder piston is known from WO 2012/152352 A, and corresponding to US Patent Publication No. 2014/197680 A1. This system can operate in a regenerative mode (generator operation).

BRIEF SUMMARY OF THE INVENTION

A regenerative electrohydraulic motor-vehicle brake system and a method for operating such a brake system are to be specified, which have an advantageous functionality in particular from the point of view of safety.

According to one aspect, a method is specified for operating a regenerative electrohydraulic motor-vehicle brake system having a master cylinder that can be supplied with hydraulic fluid from a reservoir, an electromechanical actuator for actuating a piston accommodated in the master cylinder, and a shut-off valve provided between the master cylinder and the reservoir. The method comprises the steps of actuating the electromechanical actuator with the shut-off valve being closed for generating a hydraulic pressure at a wheel brake that is fluidically connected to the master cylinder, and activating a regenerative braking operation including actuating the shut-off valve for opening same, wherein the master cylinder remains fluidically connected to the wheel brake and the electromechanical actuator is actuated in order to at least partially maintain the hydraulic pressure at the wheel brake.

It should be pointed out that the actuating of the electromagnetic actuator and the activating of the regenerative braking operation can take place substantially simultaneously or in a (for example temporally) fixed sequence. The activation step can in this case precede or else follow the actuating step. The activation step can in particular comprise the additional switching-on of an electrical generator. According to one implementation, the building-up of the hydraulic pressure is started before the braking effect of the regenerative braking operation has fully developed. Since a certain time can pass from the instant of the additional switching-on of the generator up to the development of the latter's braking effect, the regenerative braking operation can be activated before or simultaneously with the actuating of the electromagnetic actuator in order to obtain an assisting hydraulic braking effect.

The teaching presented here can be used with regard to the wheel brakes of a single vehicle axle. At the at least one other vehicle axle, a brake force by means of conventional hydraulic pressure build-up without generator assistance can take place.

The hydraulic pressure can be set with the shut-off valve being open and with the master cylinder fluidically connected to the wheel brake. Such a setting can be defined, for example, by the relationship between a first fluid volume conveyed by means of the electromechanical actuator in the master cylinder and a second fluid volume escaping into the reservoir via the shut-off valve. The relationship can change in the course of a braking procedure.

According to one implementation, the actuation of the electromechanical actuator with the shut-off valve being open and with the master cylinder fluidically connected to the wheel brake is effected in such a way that a damming-up effect is generated at a throttling point in a fluid connection between the master cylinder and the reservoir. The throttling point can be realised by inserting a throttling element into this fluid connection. The throttling element can be an element with fixedly preset or else adjustable throttling effect.

The sum of a first brake force fraction generated by means of the hydraulic pressure and a second brake force fraction generated by means of the regenerative braking operation ("generator braking force") can correspond to a brake force requested by the driver. The brake force can be requested by the driver, for example, by actuation of the brake pedal. In this connection, there can be installed one or more sensors which detect a brake pedal actuation, and the output signal of which indicates the requested brake force.

A modulation of the brake force requested by the driver can be realized at least partly via a modulation of the first brake force fraction. Additionally or alternatively to this, a modulation of the brake force requested by the driver can be realized at least partly via a modulation of the second brake force fraction.

In one implementation the brake system further comprises a mechanical actuator for actuating the master cylinder piston. The mechanical actuator can comprise an actuating member coupled or couplable to a brake pedal. In a realisation of this kind, the electromechanical actuator can be actuated in such a way that a force transmission from the actuating member to the piston is prevented. For this purpose, a decoupling device can be provided. The force transmission from the actuating member to the piston can be prevented in different ways. For example, the electromechanical actuator can be actuated in such a way that a gap is maintained in a force transmission path between the actuating member and the piston.

Also provided is a computer program product with program code means for performing the method presented here when the computer program product runs on a processor. The computer program product can be comprised by a motor-vehicle control unit or motor-vehicle control unit system.

A further aspect is directed to a regenerative electrohydraulic motor-vehicle brake system. The brake system comprises a master cylinder that can be supplied with hydraulic fluid from a reservoir, an electromechanical actuator for actuating a piston accommodated in the master cylinder, a first shut-off valve provided between the master cylinder and the reservoir and a control unit or control unit system. The control unit or control unit system is configured to actuate the electromechanical actuator with the first shut-off valve being closed for generating a hydraulic pressure at a wheel brake that is fluidically connected to the master cylinder and to activate a regenerative braking operation including actuating the first shut-off valve for opening same, wherein the master cylinder remains fluidically connected to the wheel brake and the electromechanical actuator is actuated in order to at least partially maintain the hydraulic pressure at the wheel brake.

The piston accommodated in the master cylinder can be directly or indirectly actuated by the electromechanical actuator. For example, the electromechanical actuator can be arranged for direct action on the piston of the master cylinder. For this, it can be mechanically coupled or couplable to the piston. The piston can then be directly actuated by the actuator. Alternatively to this, the electromechanical actuator can cooperate with a cylinder/piston device of the brake system different from the master cylinder and the cylinder/piston device can be fluidically coupled on the outlet side to the piston of the master cylinder. A hydraulic pressure built up in the cylinder/piston device by actuation of the electromechanical actuator can then act on the piston of the master cylinder and hydraulically actuate the piston in the master cylinder. In this configuration, the master cylinder piston can be hydraulically actuated via the hydraulic pressure generated in the cylinder/piston arrangement and with the aid of the electromechanical actuator (indirect actuation).

According to one realisation, the brake system further comprises a throttling point in a fluid connection between the master cylinder and the reservoir. The throttling point be formed by any desired throttling element. According to a first realisation, the throttling point is formed by the first shut-off valve in the open state. In other words, the first shut-off valve can have a certain throttling effect in the open state. According to another realizing, a separate throttling element is provided additionally or alternatively to the first shut-off valve.

A first overall flow resistance between the master cylinder and the wheel brake fluidically connected thereto can be less than a second overall flow resistance between the master cylinder and the reservoir with the shut-off valve being open. This situation can be brought about, for example, by causing a throttling effect in the fluid connection between the master cylinder and the reservoir in a targeted manner The brake system can have a mechanical actuator for actuating the master cylinder piston. The mechanical actuator in turn can comprise an actuating member coupled or couplable to a brake pedal. In this case, the electromechanical actuator can be actuable in such a way that a force transmission from the actuating member to the piston is preventable.

The brake system can further comprise an electrical machine which is operable as a generator for the regenerative braking operation. The braking energy can be recovered by means of this electrical machine. The recovered braking energy can be used in different ways.

The master cylinder can be fluidically connected to a plurality of wheel brakes. In the fluid connection between the master cylinder and each wheel brake there can be provided in each case at least one second shut-off valve, wherein the second shut-off valves are actuable in multiplex operation for realising a driving dynamics control. Thus, exactly one second shut-off valve (e.g. a 2/2-way valve) per wheel brake can be provided for the driving dynamics control.

According to a first variant, in the brake system presented here, the electromechanical actuator is configured to actuate the master cylinder piston in the context of a brake force boosting. The brake force to be boosted can in this case be exerted on the piston by means of the mechanical actuator. According to another variant, the electromechanical actuator is configured to actuate the piston for brake force generation. This variant can be used, for example, in the context of a brake-by-wire (BBW) operation, in which the brake pedal is (normally) mechanically decoupled from the master cylinder piston. In the case of a brake system designed for BBW operation, the mechanical actuator is used to actuate the piston, for instance, in the event of failure of a BBW component (i.e. in the event of an emergency braking)

Depending on the configuration of the vehicle brake system, the selective decoupling of the brake pedal from the master cylinder piston by means of a decoupling device can occur for different purposes. In the case of a brake system designed according to the BBW principle, apart from a "push-through mode" or an emergency braking operation (in which the brake pedal is coupled to the master cylinder piston via the mechanical actuator), permanent decoupling can be provided. In the case of a regenerative brake system, such a decoupling can take place at least in the context of a regenerative braking operation (generator operation). In other brake systems, the decoupling device and the simulation device can also be completely omitted.

To actuate the electromechanical actuator and optional further components of the vehicle brake system, the brake system can have suitable actuating devices. These actuating devices can comprise electrical, electronic or program-controlled assemblies and combinations thereof. For example, the actuating devices can be provided in a common control unit or in a system comprising separate control units (electronic control units, ECUs).

Other advantages of this invention will become apparent to those skilled in the art from the following detailed description of the preferred embodiments, when read in light of the accompanying drawings.

DETAILED DESCRIPTION OF THE INVENTION

Figure 1:
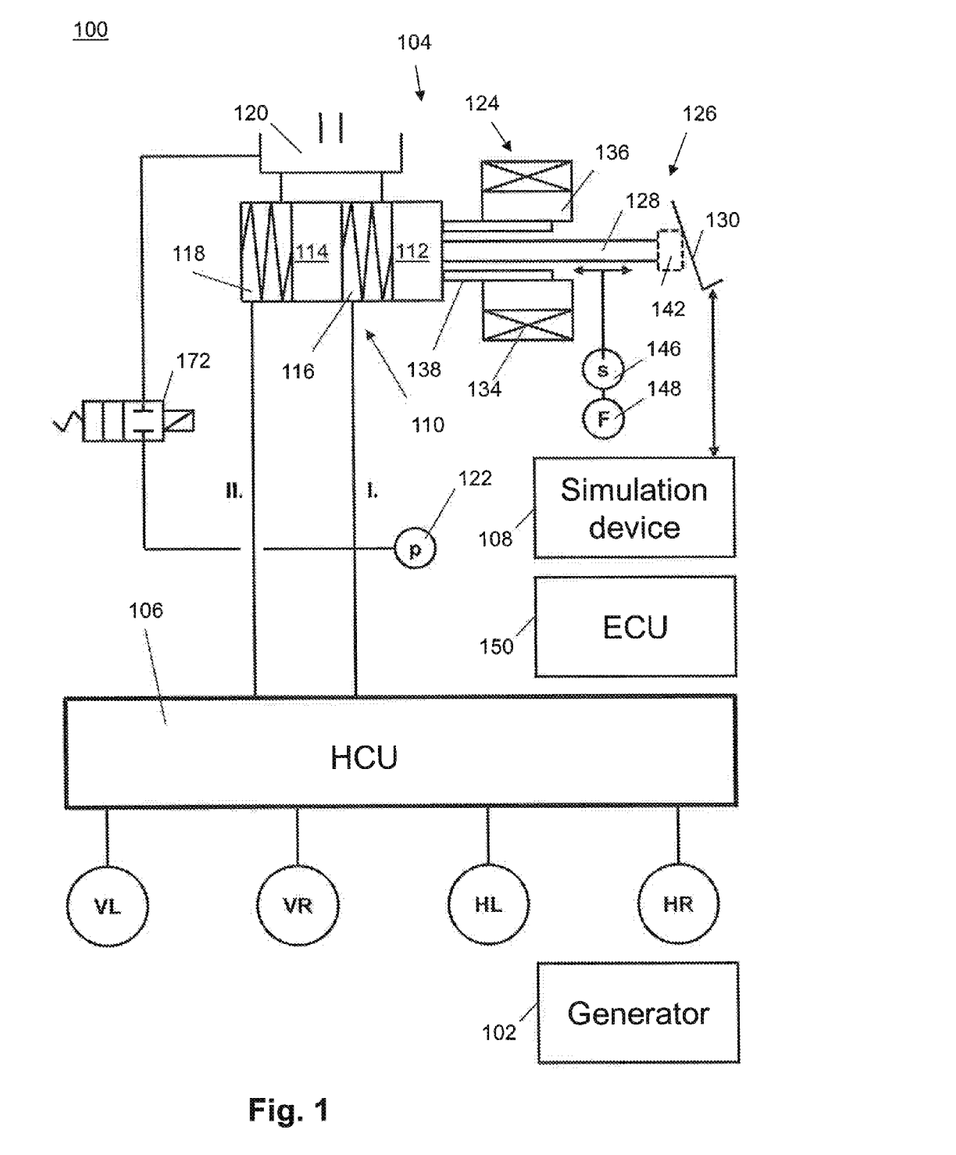
FIG. 1 shows a first embodiment of an electrohydraulic vehicle brake system.

FIG. 1 shows a first embodiment of a hydraulic vehicle brake system 100, which is based on the brake-by-wire (BBW) principle. The brake system 100 may (e.g. in the case of hybrid vehicles) be operated in a regenerative mode. For this purpose, there is provided an electrical machine 102 which provides a generator functionality and can be selectively connected to wheels and an energy store, e.g. a battery (not shown).

As illustrated in FIG. 1, the brake system 100 comprises a master cylinder assembly 104 which can be mounted on a vehicle front bulkhead. A hydraulic control unit (HCU) 106 of the brake system 100 is functionally arranged between the master cylinder assembly 104 and four wheel brakes VL, VR, HL and HR of the vehicle. The HCU 106 is configured as an integrated assembly and comprises a large number of hydraulic individual components, as well as several fluid inlets and fluid outlets. Furthermore, a merely schematically represented simulation device 108 for providing a pedal reaction behaviour in service braking operation is provided. The simulation device 108 can be based on a mechanical or hydraulic principle. In the latter case, the simulation device 108 can be connected to the HCU 106.

The master cylinder assembly 104 has a master cylinder 110 with a piston 140 accommodated displaceably therein. The piston is configured in the embodiment as a tandem piston with a primary piston 112 and a secondary piston 114 and defines in the master cylinder 110 two hydraulic chambers 116, 118 separated from one another. The two hydraulic chambers 116, 118 of the master cylinder 110 are connected to an unpressurised hydraulic fluid reservoir 120 via a respective connection in order to supply them with hydraulic fluid. Each of the two hydraulic chambers 116, 116 is further coupled to the HCU 106 and defines a respective brake circuit I. and II. In the embodiment, there is provided for the brake circuit I. a hydraulic pressure sensor 122, which could also be integrated into the HCU 106.

The master cylinder assembly 104 further comprises an electromechanical actuator 124 as well as a mechanical actuator 126. Both the electromechanical actuator 124 and the mechanical actuator 126 enable an actuation of the master cylinder piston and for this purpose act on an input-side end face of this piston, to be more precise of the primary piston 112. The actuators 124, 126 are configured in such a manner as to be able to actuate the master cylinder piston independently of one another (and separately or jointly).

The mechanical actuator 126 has a force transmission element 128 which is configured in the form of a rod and is able to act directly on the input-side end face of the primary piston 112. As shown in FIG. 1, the force transmission element 128 is coupled to a brake pedal 130. It will be understood that the mechanical actuator 126 may comprise further components which are functionally arranged between the brake pedal 130 and the master cylinder 110. Such further components can be both of a mechanical and a hydraulic nature. In the latter case, the actuator 126 is configured as a hydraulic-mechanical actuator 126.

The electromechanical actuator 124 has an electric motor 134 and a transmission 136, 138 downstream of the electric motor 134 on the drive side. In the embodiment, the transmission is an arrangement composed of a rotatably mounted nut 136 and a spindle 138 in engagement with the nut 136 (e.g. via rolling bodies such as balls) and movable in the axial direction. In other embodiments, toothed rack transmissions or other transmission types can be used.

In the present embodiment, the electric motor 134 has a cylindrical design and extends concentrically with respect to the force transmission element 128 of the mechanical actuator 126. To be more precise, the electric motor 134 is arranged radially outside with respect to the force transmission element 128. A rotor (not shown) of the electric motor 134 is coupled in a rotationally fixed manner to the transmission nut 136, in order to set the latter in rotation. A rotary movement of the nut 136 is transmitted to the spindle 138 in such a manner that an axial displacement of the spindle 138 results. In this procedure, the end side, on the left in FIG. 1, of the spindle 138 can come into abutment (optionally via an intermediate member) with the end side, on the right in FIG. 1, of the primary piston 112 and consequently displace the primary piston 112 (together with the secondary piston 114) to the left in FIG. 1. Furthermore, the piston arrangement 112, 114 can also be displaced to the left in FIG. 1 by the force transmission element 128, extending through the spindle 138 (configured as a hollow body), of the mechanical actuator 126. A displacement of the piston arrangement 112, 114 to the right in FIG. 1 is brought about by means of the hydraulic pressure prevailing in the hydraulic chambers 116, 118 (upon release the brake pedal 130 and optionally upon motive displacement of the spindle 138 to the right).

In the variant of the master cylinder assembly 104 shown in FIG. 1, the electromechanical actuator 124 is arranged in such a manner that it can act directly on the piston (to be more precise on the primary piston 112) of the master cylinder 110 to build up a hydraulic pressure at the wheel brakes. In other words, the piston 112 of the master cylinder 110 is mechanically actuated directly by the electromechanical actuator 124.

In an alternative configuration of the master cylinder assembly 104, the piston of the master cylinder 110 can be hydraulically actuated (not shown in FIG. 1) with the aid of the electromechanical actuator 124. In this case, the master cylinder 110 can be fluidically coupled to a further cylinder/piston device cooperating with the electromechanical actuator 124. Concretely, the cylinder/piston device coupled to the electromechanical actuator 124 can be, for example, fluidically coupled on the outlet side to the primary piston 112 of the master cylinder 110 in such a manner that a hydraulic pressure generated in the cylinder/piston device acts directly on the primary piston 112 and thus leads to an actuation of the primary piston 112 in the master cylinder 110. The primary piston 112 is then, in a regulation owing to the hydraulic pressure acting, displaced in the master cylinder 110 to such an extent (displacement to the left in FIG. 1) until the hydraulic pressure generated in the master cylinder chambers 116, 118 corresponds to the hydraulic pressure generated in the additional cylinder/piston device.

As shown in FIG. 1, a decoupling device 142 is functionally provided between the brake pedal 130 and the force transmission element 128. The decoupling device 142 enables a selective decoupling of the brake pedal 130 from the piston arrangement 112, 115 in the master cylinder 110, for example by interruption of the force transmission path. In the following, the functioning of the decoupling device 142 and of the simulation device 108 is explained in more detail. In this connection, it should be pointed out that the brake system 100 shown in FIG. 1 is based on the principle of brake-by-wire (BBW). This means that, in the context of a normal service braking, both the decoupling device 142 and the simulation device 108 are activated. Accordingly, the brake pedal 130 is decoupled from the force transmission element 128 (and thus from the piston arrangement 112, 114 in the master cylinder 110), and an actuation of the piston arrangement 112, 114 can take place exclusively via the electromechanical actuator 124. In this case, the usual pedal reaction behaviour is provided by the simulation device 108 coupled to the brake pedal 130.

In the context of the service braking, the electromechanical actuator 124 thus performs the brake force generating function. In this case, a brake force requested by depressing the brake pedal 130 is generated by the fact that the spindle 138 is displaced to the left in FIG. 1 by means of the electric motor 134 and as a result the primary piston 112 and the secondary piston 114 of the master cylinder 110 are also moved to the left. In this way, hydraulic fluid is conveyed from the hydraulic chambers 116, 118 via the HCU 106 to the wheel brakes VL, VR, HL and HR.

The level of the brake force, resulting therefrom, of the wheel brakes VL, VR, HL and HR is set in dependence on a sensor-detected brake pedal actuation. For this purpose, a travel sensor 146 and a force sensor 148 are provided, the output signals of which are evaluated by a control unit (electronic control unit, ECU) 150 driving the electric motor 134. The travel sensor 146 detects an actuation travel associated with an actuation of the brake pedal 130, while the force sensor 148 detects an actuation force associated therewith. A drive signal for the electric motor 134 is generated by the control unit 150 in dependence on the output signals of the sensors 146, 148 (and optionally of the pressure sensor 122).

Since the procedures in the case of a service braking have been explained in more detail, the emergency braking operation ("push-through" mode) will now be briefly outlined. The emergency braking operation is, for example, the consequence of the failure of the vehicle battery or of a component of the electromechanical actuator 124. A deactivation of the decoupling device 142 (and of the simulation device 108) in the emergency braking operation enables a direct coupling of the brake pedal 130 to the master cylinder 110, namely via the force transmission element 128. The emergency braking is initiated by depressing the brake pedal 130. The brake pedal actuation is then transmitted via the force transmission element 128 to the master cylinder 110. Consequently, the piston arrangement 112, 114 is displaced to the left in FIG. 1. As a result, for the brake force generation, hydraulic fluid is conveyed from the hydraulic chambers 116, 118 of the master cylinder 110, via the HCU 106, to the wheel brakes VL, VR, HL and HR.

According to a first embodiment, the HCU 106 has, with regard to the driving dynamics control operation (brake control functions such as ABS, TCS, ESP, etc.), a basically conventional structure with a total of 12 valves (in addition to valves used, for example, in connection with the activation or deactivation of the decoupling device 142 and the simulation device 106). Since the electromagnetic actuator 124 is then (optionally exclusively) actuated in the context of a brake force generation, the additional control functions are carried out in a known manner by means of the HCU 106 (and optionally a separate hydraulic pressure generator such as a hydraulic pump) A hydraulic pressure generator in the HCU 106 may, however, also be dispensed with. The electromechanical actuator 124 then additionally also performs the pressure modulation in the context of the control operation. A corresponding control mechanism is implemented for this purpose in the control unit 150 provided for the electromechanical actuator 124.

As shown in FIG. 1, the brake system 100 further comprises a valve 172 which is configured as a shut-off valve and can be integrated into the HCU 106. The valve 172 is provided functionally between the hydraulic chamber 116 and the unpressurised hydraulic fluid reservoir 120. In some embodiments, a further valve of this kind (not shown) can be functionally present between the other hydraulic chamber 118 and the reservoir 120.

The valve 172 is used for the regenerative braking operation. If the regenerative braking operation is activated during a service braking, the generator 102 is additionally switched on in a known manner In order to be able to fully utilise the generator effect energetically, usually no hydraulic pressure is built up at the wheel brakes VL, VR, HL and HR of the wheels which are braked via the generator 102. The hydraulic chambers 116, 118 are for this purpose decoupled from the corresponding wheel brakes VL, VR, HL and HR via the HCU 106.

During an actuation of the brake pedal 130, the primary piston 112 and the secondary piston 114 in FIG. 1 then also have to be displaced to the left (typically by means of the electromechanical actuator 124) in order to provide sufficient axial clearance for an actuation of the brake pedal 130. The hydraulic fluid displaced from the hydraulic chambers 116, 118 is, however, unable to reach the wheel brakes VL, VR, HL and HR in order to be able to utilise the generator braking force to the maximum (i.e. in order not to build up any hydraulic pressure). For this purpose, the valve 172 between the hydraulic chamber 116 and the reservoir 120 (and/or the optionally provided valve between the hydraulic chamber 118 and the reservoir 120) are opened. The hydraulic fluid escaping from the hydraulic chambers 116, 118 can thus reach the unpressurised reservoir 120.

Figure 2:
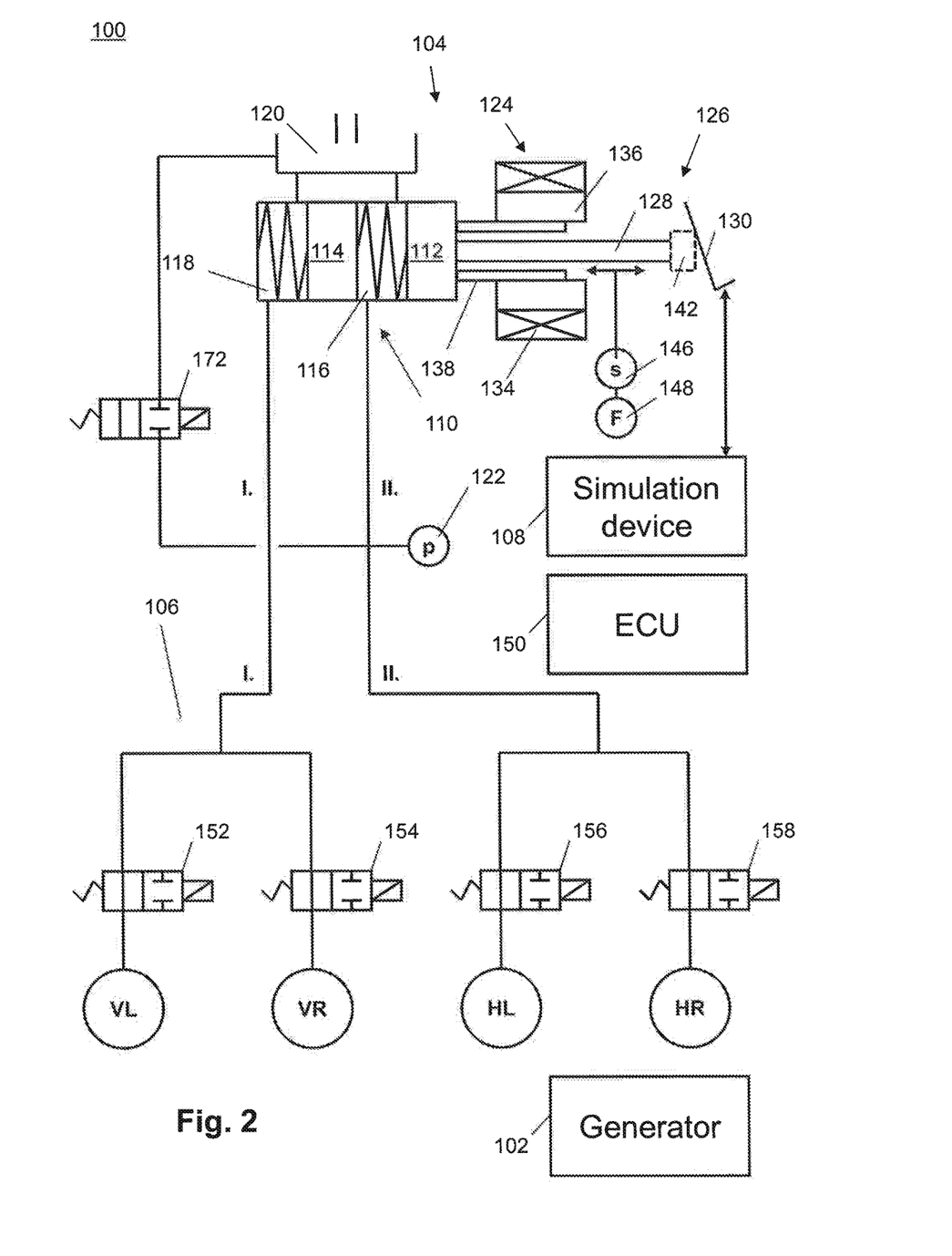
FIG. 2 shows a second embodiment of an electrohydraulic vehicle brake system.

In the case of a further embodiment according to FIG. 2, the special valves for the driving dynamics control operation (e.g. the TCS and ESP operation) may be dispensed with in the HCU 106, except for four valves 152, 154, 156, 158. In the case of this other embodiment of the HCU 106, recourse may thus be had to the valve arrangement having only four valves 152, 154, 156, 158 (and the corresponding actuation) known from WO 2010/091883 A or WO 2011/141158 A (cf. FIG. 15). The hydraulic pressure modulation in the control operation then also takes place by means of the electromechanical actuator 124. In other words, the electromechanical actuator 124 is actuated in this case not only for brake force generation in the context of a service braking, but also, for example, for the purpose of driving dynamics control (thus e.g. in the ABS and/or TCS and/or ESP control operation). Together with the actuation of the electromechanical actuator 124, your wheel-individual or wheel-group-individual actuation of the valves 152, 154, 156, 158 takes place in multiplex operation. In the implementation shown in FIG. 2, no further valves for driving dynamics control purposes are present between the valves 152, 154, 156, 158 and the master cylinder.

The multiplex operation may be a time multiplex operation. In this case, generally individual time slots can be preset. One or more of the valves 152, 154, 156, 158 can be assigned in turn an individual time slot, which valves can be actuated once or more than once (for example by changing the switching state from open to closed and/or vice versa) during the corresponding time slot. According to one realisation, each of the valves 152, 154, 158 can be assigned exactly one time slot. One or more further valve arrangements (not shown in FIG. 2) can be assigned one or more further time slots.

In multiplex operation, for example, initially a plurality of or all of the valves 152, 154, 156, 158 can be opened and simultaneously a hydraulic pressure can be built up at a plurality of or all of the assigned wheel brakes VL, VR, HL and HR by means of the electromechanical actuator 124. When a wheel-individual target pressure is reached, the corresponding valve 152, 154, 156, 158 then closes timeslot-synchronously, while one or more further valves 152, 154, 156, 158 still remain open until the respective target pressure is reached at those too. In multiplex operation, the four valves 152, 154, 156, 158 are therefore opened and closed individually per wheel or wheel group in dependence on the respective target pressure.

According to one embodiment, the valves 152, 154, 156, 158 are realised as 2/2-way valves and configured, for example, as non-adjustable shut-off valves. In this case, therefore, no opening cross-section can be adjusted, as would be the case for example with proportional valves. In another embodiment, the valves 152, 154, 156, 158 are realised as proportional valves with adjustable opening cross-section.

Figure 3:
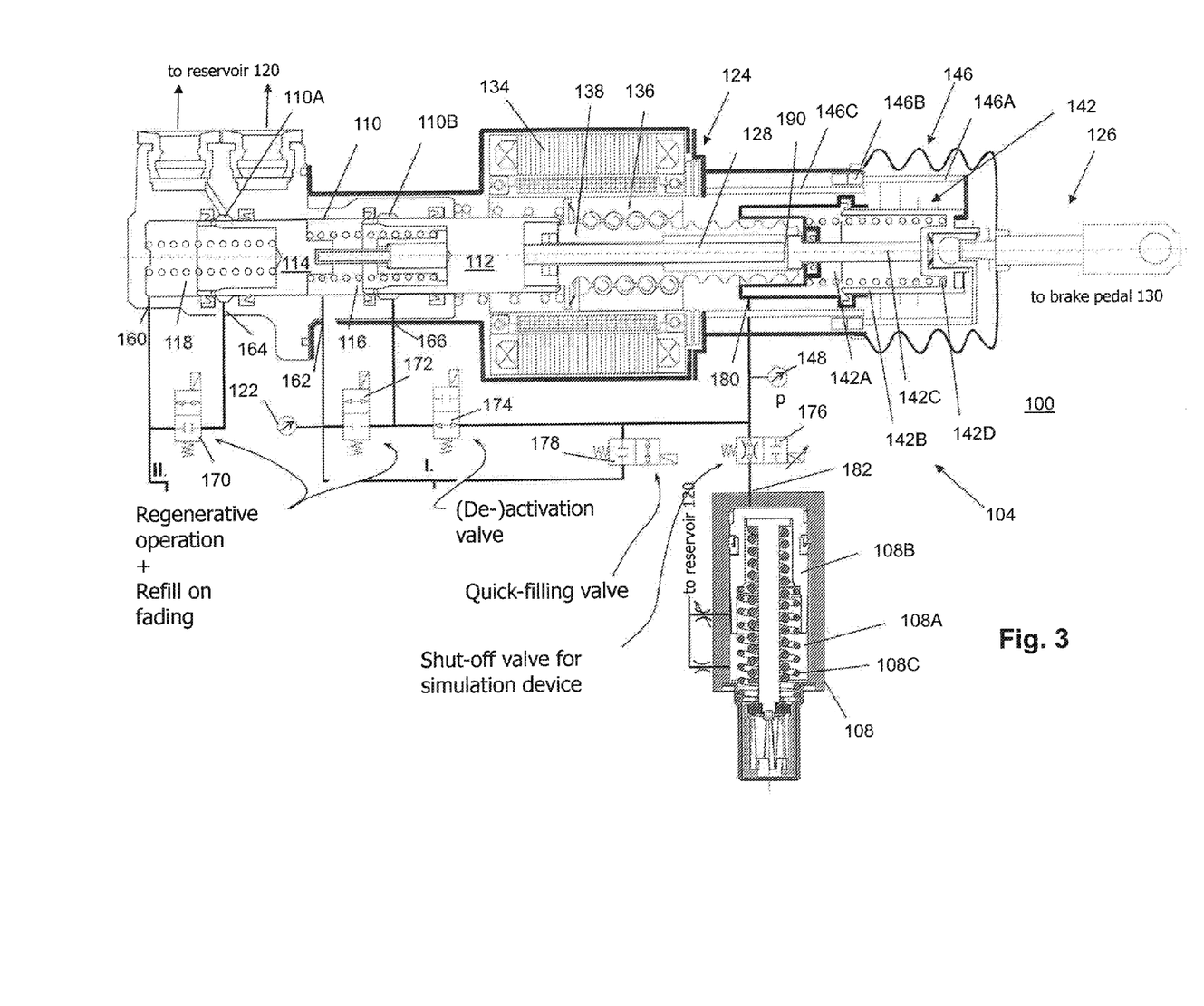
FIG. 3 shows a third embodiment electrohydraulic vehicle brake system.

FIG. 3 shows a more detailed embodiment of a vehicle brake system 100, which is based on the operating principle explained in connection with the schematic embodiment of FIGS. 1 and 2. Identical or similar elements have been provided with the same reference symbols as FIGS. 1 and 2, and their explanation is dispensed with in the following. For the sake of clarity, the ECU, the wheel brakes, the four valve units of the HCU assigned to the wheel brakes, and the generator for the regenerative braking operation have not been shown.

The vehicle brake system 100 illustrated in FIG. 3 also comprises two brake circuits I. and II., two hydraulic chambers 116, 118 of a master cylinder 110 being respectively assigned again to exactly one brake circuit I., II. The master cylinder 110 has two connections per brake circuit I., II. The two hydraulic chambers 116, 118 here lead to a respective first connection 160, 162, via which hydraulic fluid can be conveyed from the respective chamber 116, 118 into the assigned brake circuit I., II. Furthermore, each of the brake circuits I. and II. can be connected via a respective second connection 164, 166, which leads into a corresponding annular chamber 110A, 110B in the master cylinder 110, to the unpressurised hydraulic fluid reservoir (reference symbol 120 in FIG. 1) not shown in FIG. 3.

Between the respective first connection 160, 162 and the respective second connection 164, 166 of the master cylinder 110 there is provided a respective valve 170, 172 which is realised as a 2/2-way valve in the embodiment. The first and second connections 160, 162, 164, 166 can be selectively connected to one another by means of the valves 170, 172. This corresponds to a "hydraulic short circuit" between the master cylinder 110 on the one hand and, on the other hand, the unpressurised hydraulic fluid reservoir (which is then connected to the hydraulic chambers 116, 118 via the annular chambers 110A, 110B). In this state, the pistons 112, 114 in the master cylinder 110 can be displaced by the electromechanical actuator 124 or the mechanical actuator 126 in a manner substantially free from resistance ("free travel clearance"). The two valves 170, 172 thus enable, for example, a regenerative braking operation (generator operation). Here, the hydraulic fluid displaced from the hydraulic chambers 116, 118 upon a conveying movement in the master cylinder 110 is then led not to the wheel brakes, but to the unpressurised hydraulic fluid reservoir, without a hydraulic pressure build-up (usually undesired in the regenerative braking operation) occurring at the wheel brakes. A braking effect is then obtained in the regenerative braking operation by the generator (cf. reference symbol 102 in FIGS. 1 and 2).

It should be pointed out that the regenerative braking operation can be implemented by axle. In the case of an axle-based brake circuit configuration, therefore, one of the two valves 170, 172 can be closed and the other open in the regenerative braking operation.

The two valves 170, 172 furthermore enable the reduction of hydraulic pressure at the wheel brakes. Such a pressure reduction may be desired in the event of failure (e.g. blocking) of the electromechanical actuator 124 or in the driving dynamics control operation, in order to avoid a return stroke of the electromechanical actuator 124 (e.g. in order to avoid a reaction on the brake pedal). For the pressure reduction also, the two valves 170, 172 are transferred into their open position, whereby hydraulic fluid can flow out of the wheel brakes, via the annular chambers 110A, 110B in the master cylinder 110, back into the hydraulic fluid reservoir.

Finally, the valves 170, 172 also enable a refilling of the hydraulic chambers 116, 118 as well. Such a refilling may be required during a braking procedure in progress (e.g. owing to so-called brake "fading"). For refilling, the wheel brakes are fluidically separated from the hydraulic chambers 116, 118 via assigned valves of the HCU (not shown in FIG. 3). The hydraulic pressure prevailing at the wheel brakes is thus "locked in". Thereupon, the valves 170, 172 are opened. Upon a subsequent return stroke of the pistons 112, 114 provided in the master cylinder 110 (to the right in FIG. 3), hydraulic fluid is then sucked out of the unpressurised reservoir into the chambers 116, 118. Finally, the valves 170, 172 can be closed again and the hydraulic connections to the wheel brakes opened again. Upon a subsequent conveying stroke of the pistons 112, 114 (to the left in FIG. 3), the previously "locked in" hydraulic pressure can then be further increased.

As shown in FIG. 3, in the present embodiment both a simulation device 108 and a decoupling device 142 are based on a hydraulic principle. Both devices 108, 142 comprise a respective cylinder 108A, 142A for receiving hydraulic fluid and a piston 108B, 142B accommodated in the respective cylinder 108A, 142A. The piston 142B of the decoupling device 142 is mechanically coupled to a brake pedal (cf. reference symbol 130 in FIGS. 1 and 2) not shown in FIG. 3. Furthermore, the piston 142B has an extension 142C extending in the axial direction through the cylinder 142A. The piston extension 142C runs coaxially with respect to a force transmission element 128 for the primary piston 112 and is arranged upstream of the latter in the actuating direction of the brake pedal.

Each of the two pistons 108B, 142B is biased into its starting position by an elastic element 108C, 142D (here in each case a helical spring). The characteristic of the elastic element 108C of the simulation device 108 defines here the desired pedal reaction behaviour.

As further shown in FIG. 3, the vehicle brake system 100 in the present embodiment comprises three further valves 174, 176, 178, which are realised here as 2/2-way valves. It will be understood that individual ones of or all of these three valves 174, 176, 178 may be omitted in other embodiments in which the corresponding functionalities are not required. Furthermore, it will be understood that all of these valves may be part of a single HCU block (cf. reference symbol 106 in FIGS. 1 and 2). This HCU block may comprise further valves (cf. FIG. 4 below).

The first valve 174 is provided, on the one hand, between the decoupling device 142 (via a connection 180 provided in the cylinder 142A) and the simulation device 108 (via a connection 182 provided in the cylinder 108A) and, on the other hand, the unpressurised hydraulic fluid reservoir (via the connection 166 of the master cylinder 110). Arranged upstream of the connection 182 of the cylinder 108A is the second valve 176, which has a throttling characteristic in its let-through position. The third valve 178, finally, is provided between the hydraulic chamber 116 (via the connection 116) and the brake circuit I., on the one hand, and the cylinder 142A of the decoupling device 142 (via the connection 180), on the other hand.

The first valve 174 enables a selective activation and deactivation of the decoupling device 142 (and indirectly also of the simulation device 108). If the valve 174 is in its open position, the cylinder 142A of the decoupling device 142 is hydraulically connected to the unpressurised hydraulic reservoir. In this position, the decoupling device 142 is deactivated in accordance with the emergency braking operation. Furthermore, the simulation device 108 is also deactivated.

The opening of the valve 174 has the effect that, upon displacement of the piston 142B (as a result of an actuation of the brake pedal), the hydraulic fluid received in the cylinder 142A can be conveyed into the unpressurised hydraulic fluid reservoir in a manner largely free from resistance. This procedure is substantially independent of the position of the valve 176, since the latter also has a significant throttling effect in its open position. Thus, in the open position of the valve 174, the simulation device 108 is also indirectly deactivated.

Upon a brake pedal actuation in the open state of the valve 174, the piston extension 142C overcomes a gap 190 towards the force transmission element 128 and consequently comes into abutment against the force transmission element 128. After the gap 190 has been overcome, the force transmission element 128 is taken along by the displacement of the piston extension 142C and thereupon actuates the primary piston 112 (and—indirectly—the secondary piston 114) in the brake master cylinder 110. This corresponds to the direct coupling, already explained in connection with FIG. 1, of brake pedal and master cylinder piston for the hydraulic pressure build-up in the brake circuits I., II. in the emergency braking operation.

By contrast, when the valve 174 is closed (and the valve 178 is closed), the decoupling device 142 is activated. This corresponds to the service braking operation. In this case, upon an actuation of the brake pedal, hydraulic fluid is conveyed from the cylinder 142A into the cylinder 108A of the simulation device 108. In this way, the simulator piston 108B is displaced against the counterforce provided by the elastic element 108C, so that the usual pedal reaction behaviour arises. Simultaneously, the gap 190 between the piston extension 142C and the force transmission element 128 is further maintained. As a result, the brake pedal is mechanically decoupled from the master cylinder.

In the present embodiment, the maintaining of the gap 190 takes place as a result of the fact that the primary piston 112 is moved, by means of the electromechanical actuator 124, at least as quickly to the left in FIG. 3 as the piston 142B is moved to the left owing to the brake pedal actuation. Since the force transmission element 128 is coupled mechanically or otherwise (e.g. magnetically) to the primary piston 112, the force transmission element 128 moves together with the primary piston 112 upon actuation of the latter by means of the transmission spindle 138. This carrying-along of the force transmission element 128 allows the gap 190 to be maintained.

The maintaining of the gap 190 in the service braking operation requires precise detection of the distance travelled by the piston 142B (and thus of the pedal travel). For this purpose, a travel sensor 146 based on a magnetic principle is provided. The travel sensor 146 comprises a plunger 146A which is rigidly coupled to the piston 142B and to the end of which is attached a magnetic element 146B. The movement of the magnetic element 146B (i.e. the distance travelled by the plunger 146B and piston 142B) is detected by means of a Hall sensor 146C. An output signal of the Hall sensor 146C is evaluated by a control unit (cf. reference symbol 150 in FIGS. 1 and 2) not shown in FIG. 3. Based on this evaluation, the electromechanical actuator 124 can then be activated.

Now to the second valve 176, which is arranged upstream of the simulation device 108 and can be omitted in some embodiments. This valve 176 has a preset or adjustable throttling function. By means of the adjustable throttling function, for example a hysteresis or other characteristic for the pedal reaction behaviour can be obtained. Furthermore, by selective closing of the valve 176, the movement of the piston 142B (when the valves 174, 178 are closed) and thus the brake pedal travel can be limited.

The third valve 178 enables in its open position the conveying of hydraulic fluid from the piston 142A into the brake circuit I. or the hydraulic chamber 116 of the master cylinder 110 and vice versa. A conveying of fluid from the piston 142A into the brake circuit I. enables, for example, a rapid braking (e.g. before the beginning of the conveying action of the electromechanical actuator 124), the valve 178 being immediately closed again. Furthermore, when the valve 178 is open, a hydraulic reaction (e.g. of a pressure modulation generated by means of the electromechanical actuator 124 in the driving dynamics control operation) on the brake pedal via the piston 142B can be obtained.

In a hydraulic line leading to the connection 180 of the cylinder 142A, there is provided a pressure sensor 148 whose output signal allows a conclusion to be drawn about the actuating force on the brake pedal. The output signal of this pressure sensor 148 is evaluated by a control unit (not shown in FIG. 3). Based on this evaluation, an actuation of one or more of the valves 170, 172, 174, 176, 178 for realising the above-described functionalities can then take place. Furthermore, the electromechanical actuator 124 can be actuated based on this evaluation.

Figure 4:
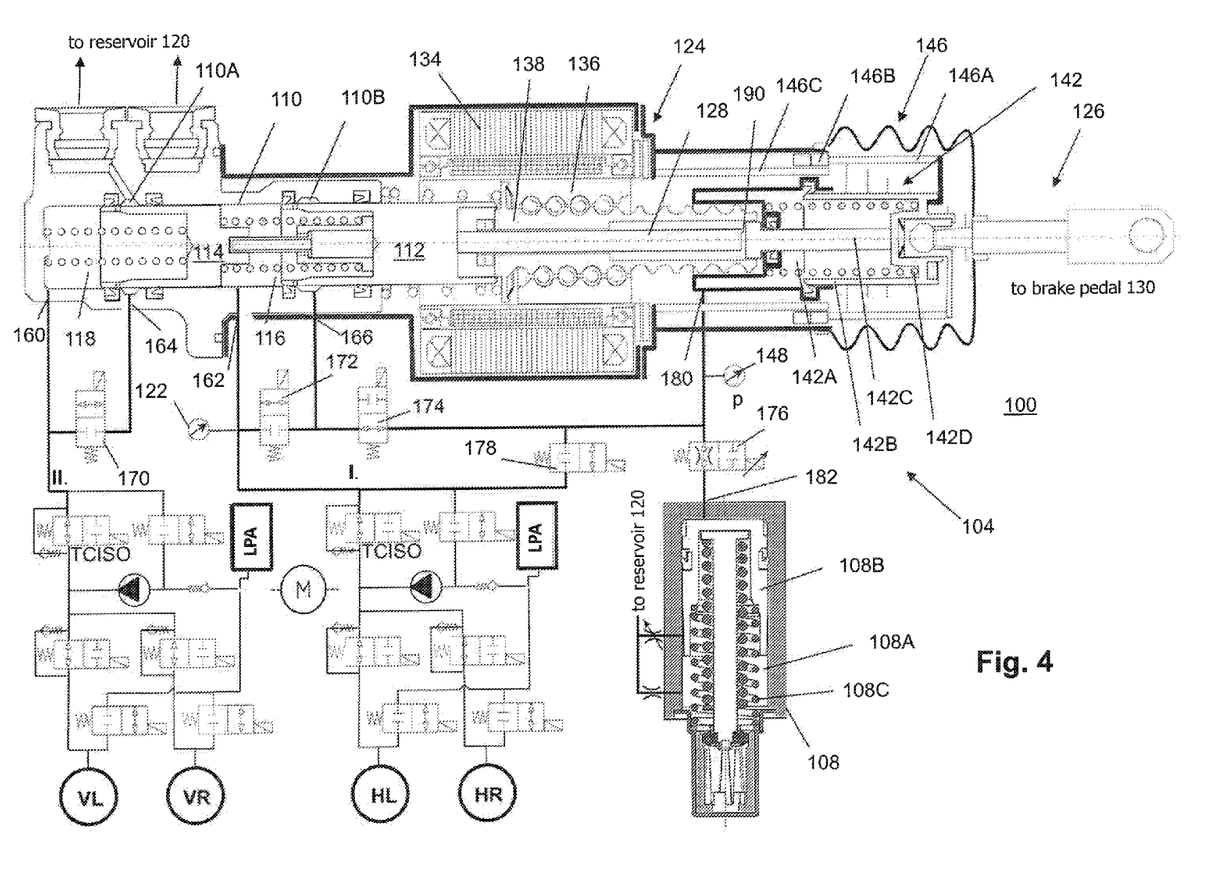
FIG. 4 shows a fourth embodiment electrohydraulic vehicle brake system.

In the brake system 100 shown in FIG. 3, the HCU 106 shown in FIG. 1 can be used. An exemplary realisation of this HCU 106 for the brake system 100 according to FIG. 3 is shown in FIG. 4. Here, a total of 12 (additional) valves are provided for realising the driving dynamics control functions, as well as an additional hydraulic pump. In an alternative embodiment, for the brake system 100 shown in FIG. 3, the multiplex arrangement according to FIG. 2 (with a total of four valves in addition to the valves illustrated in FIG. 3) can also be used.

In the embodiments shown in FIGS. 1 to 4, for the regenerative braking the generator 102 is additionally switched on and one or both of the valves 170, 172 are opened in order to realise a "free travel clearance" for the primary piston 112 and the secondary piston 114. Since, from the instant when the generator 102 is additionally switched on until a significant generator braking force is obtained, a certain period of time passes, it may be desirable in some situations (e.g. for rapid braking) to generate at least initially an assisting hydraulic pressure at the wheel brakes VL, VR, HL and HR and thus an assisting braking force. This can be done by actuating the electromechanical actuator 124 with closed valves 170, 172 and open fluid connection between the master cylinder 110 (i.e. the hydraulic chambers 116, 118) and the wheel brakes VL, VR, HL and HR.

Now the situation may arise where the driver further increases an initial deceleration request which, however, would be completely achievable with the generator braking force. In such a situation, there are consequently many boundary conditions. The vehicle brakes hydraulically, and the wheel brakes VL, VR, HL and HR are subjected to hydraulic pressure. A requested further increase of the braking force can be achieved (only) by means of the generator braking force. In this case, the prevailing hydraulic pressure at the wheel brakes VL, VR, HL and HR should if possible not change (for example not increase, so as not to lessen the generator effect). At the same time, for safety reasons, the fluid connection between the hydraulic chambers 116, 118 and the wheel brakes VL, VR, HL and HR should remain open. For example, no valves should be switched in this fluid connection, since an incorrect switching of such valves in the HCU 106 could result in a loss of deceleration for the vehicle.

There exists therefore the need to at least be able to retain a hydraulic pressure at the wheel brakes VL, VR, HL and HR or ideally still change it, while simultaneously a free travel clearance takes place. According to the flow diagram 500, illustrated in FIG. 5, of an embodiment for operating the regenerative electrohydraulic brake system according to one of FIGS. 1 to 4 two steps are initiated for this purpose.

Figure 5:
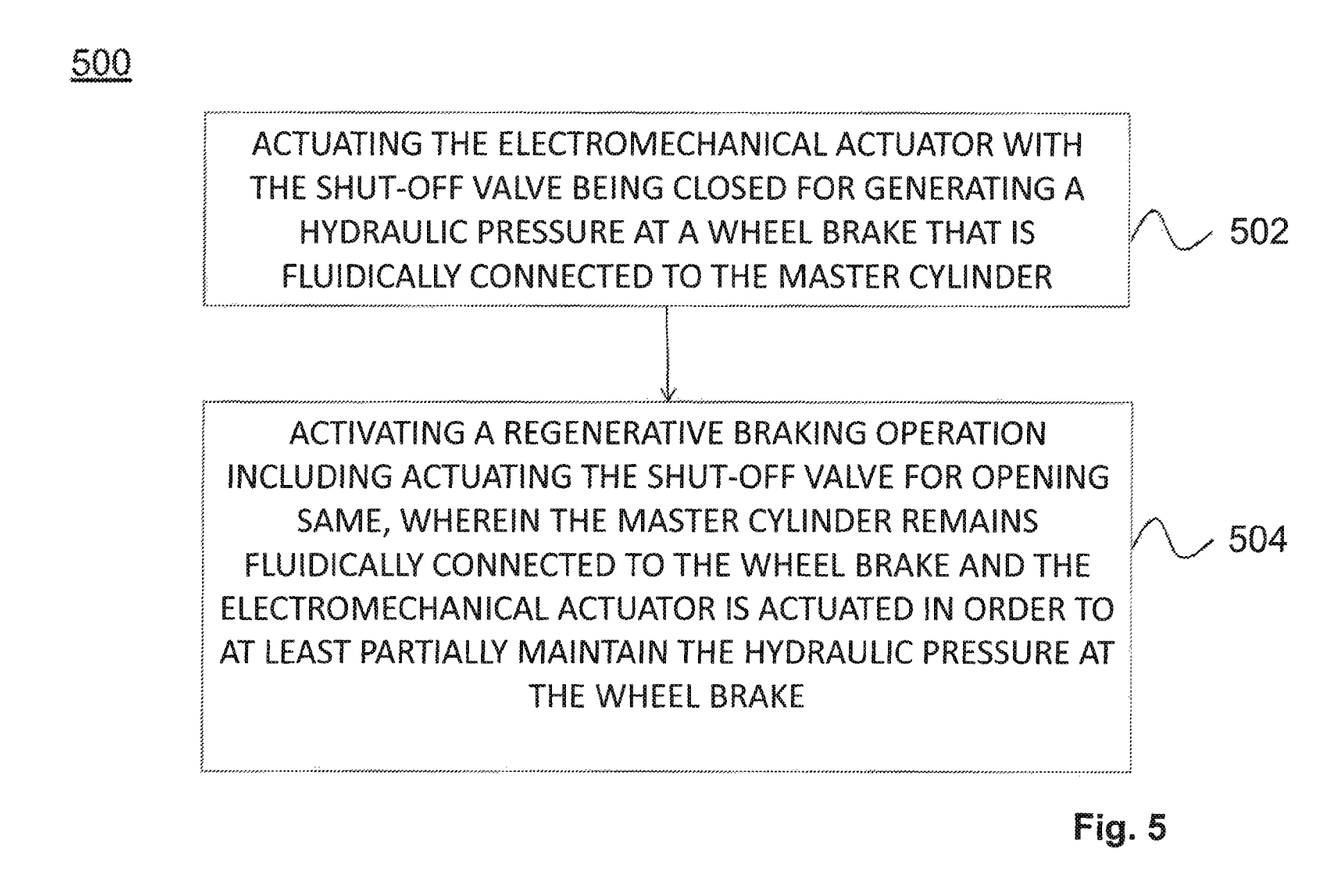
FIG. 5 shows a flow diagram which illustrates an embodiment of a method for operating the electrohydraulic vehicle brake system according to one of the preceding figures.

A first step 502 comprises actuating the electromechanical actuator 124 with the valves 170, 172 being closed for generating a hydraulic pressure at at least one of the wheel brakes VL, VR, HL and HR. In this way, even before the beginning of the generator braking force, hydraulic pressure can be generated at the wheel brakes VL, VR, HL and HR with the regenerative braking operation activated for a rapid braking It is understood that, for generating this hydraulic pressure, the fluid connection between the hydraulic chambers 1116, 118 of the master cylinder 110 and the wheel brakes VL, VR, HL and HR must be opened.

Following this step, with the regenerative braking operation activated, an actuation of at least one of the valves 170, 172 for opening the same takes place. This corresponds to step 504. During this, the hydraulic chambers 116, 118 of the master cylinder 110 remain fluidically connected to the wheel brakes VL, VR, HL and HR. Furthermore, the electromechanical actuator 124 is actuated in such a way that the hydraulic pressure at the wheel brakes VL, VR, HL and HR is at least partially maintained. In this connection, it should be pointed out that the regenerative braking operation does not have to comprise all four wheel brakes VL, VR, HL and HR. Rather, the regenerative braking operation may be limited to the front axle (wheel brakes VL and VR) or the rear axle (wheel brakes HL and HR).

In step 504 the speed of the electric motor 134 is utilised to feed at least as much volume of hydraulic fluid from the hydraulic chambers 116, 118 as flows out via one or both of the valves 170, 172 into the reservoir 120. In this connection, owing to the high dynamics of the electric motor 134, a damming-up effect at a throttling point in the fluid connection between the master cylinder 110 and the reservoir 120 can be utilised. This damming-up effect has the effect that the hydraulic pressure built up at the wheel brakes VL, VR, HL and HR in step 502 is at least maintained or at least only slightly reduced, although the wheel brakes VL, VR, HL and HR are fluidically connected both to the master cylinder 110 and (via the open valve 170 and/or 172) to the unpressurised reservoir 120. A substantial pressure drop at the wheel brakes VL, VR, HL and HR can thus be prevented. The hydraulic pressure at the wheel brakes VL, VR, HL and HR is set, with valve 170 and/or 172 open and fluid communication with the master cylinder 110, by the relationship between a first fluid volume conveyed by means of the electromechanical actuator 124 in the master cylinder 110 and a second fluid volume escaping via the valve 170 and/or the valve 172 into the reservoir 120.

The brake force acting as a whole on the vehicle is the sum of a first brake force fraction generated at the wheel brakes VL, VR, HL and HR by means of the hydraulic pressure and a second brake force fraction generated by means of the regenerative braking operation (generator braking force). This sum is set so that it corresponds to a brake force requested by the driver and sensor-detected at the brake pedal. A modulation of the brake force requested by the driver (e.g. an increase or a decrease) can be realized via a modulation of the first brake force fraction and/or a modulation of the second brake force fraction. For example, the electromechanical actuator 124 can be operated in such a way that, to maintain the hydraulic pressure at the wheel brakes VL, VR, HL and HR, exactly the same amount of hydraulic fluid is conveyed from the master cylinder 110 as is discharged into the unpressurised reservoir 120. If, by contrast, more hydraulic fluid is conveyed from the master cylinder 110, the hydraulic pressure (and thus the brake force produced by the wheel brakes VL, VR, HL and HR) increases and vice versa.

The throttling point can be realised in the fluid connection between the master cylinder 110 and the reservoir 120 in various ways. On the one hand, a throttling element with fixedly preset or variable throttling cross-section could be inserted into the return line to the reservoir 120, in which the valve 170 and/or the valve 172 is arranged. In the present embodiments, such an additional component is dispensed with and instead the throttling effect of the valve 170 and/or of the valve 172 in the open state is used to generate the desired damming-up effect. The throttling effect resulting therefrom is chosen in such a way that an overall flow resistance between the master cylinder 110 and the wheel brakes VL, VR, HL and HR is less than an overall flow resistance between the master cylinder 110 and the reservoir 120 (with valve 170 and/or 172 being open).

The procedure proposed here has the advantage that, despite opening at least one of the valves 170, 172, an interruption of the hydraulic connection between the master cylinder 110 and the wheel brakes VL, VR, HL and HR (by closing corresponding valves of the HCU 106) is not necessary. This is desirable for safety reasons, since a communication error incorrectly not to switch the corresponding shut-off valves of the HCU 106 (e.g. the TCISO valves in FIG. 4) would result in a loss of deceleration. Furthermore, the solution presented here can, according to one implementation, be realised without additional components, since the inherent throttling effect of the open valve 170 and/or 172 can be utilised. The gap 190 between the actuation element 128 and the piston extension 142C can also be maintained in an implementation of the technical teaching presented here. In other words, the brake pedal 130 can be mechanically decoupled from the master cylinder 110.

A closing of the fluid connection between the master cylinder 110 and the wheel brakes VL, VR, HL and HR can be limited to those cases in which a refilling of the hydraulic chambers 116, 118 with hydraulic fluid from the reservoir 120 has to take place.

Figure 6A:
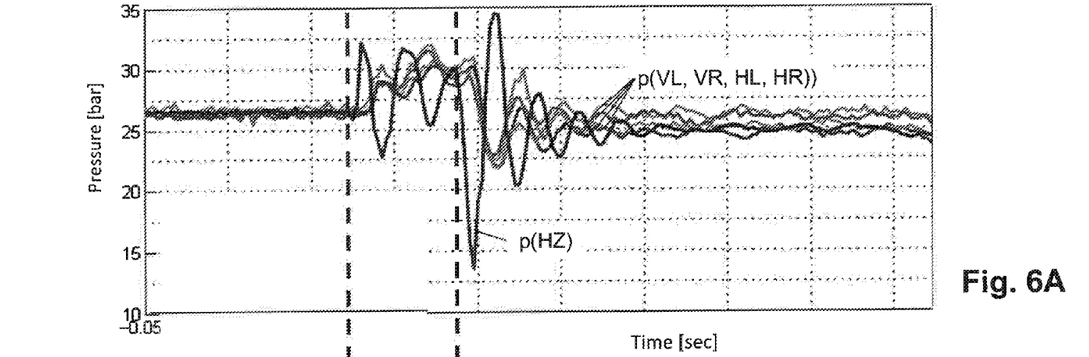
FIGS. 6A and 6B show diagrams which illustrate the hydraulic pressure profile and the actuation of the electromechanical actuator.
Figure 6B:
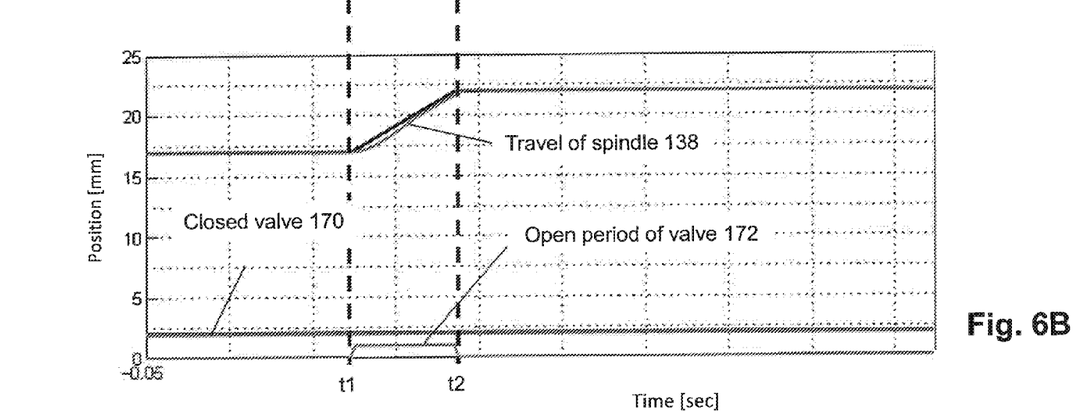

FIGS. 5A and 5B illustrate, by way of example, the pressure profile with respect to time in the master cylinder 110 and at the wheel brakes VL, VR, HL and HR (FIG. 6A) as a result of an actuation of the electromechanical actuator 124 with valve 172 open and valve 170 closed (FIG. 6B). In this connection, it should be pointed out that a pressure drop in one of the two chambers 116, 118 affects both brake circuits I., II. owing to the floating master cylinder pistons 112, 114.

As illustrated in FIG. 6A at the top, even before the instant t1 the electromechanical actuator 124, with valves 170, 172 closed, was actuated in such a way that a hydraulic pressure of approximately 23 bar is applied to the wheel brakes VL, VR, HL and HR. Owing to the open fluid connection between the master cylinder 110 and the wheel brakes VL, VR, HL and HR, the same hydraulic pressure prevails in the master cylinder 110 (i.e. in the chambers 116, 118). The hydraulic pressure illustrated in FIG. 6A served for a rapid braking in the context of a regenerative braking operation. The regenerative braking operation was activated by additionally switching on the generator 102. This activation took place in close temporal association with the build-up of the hydraulic pressure illustrated in FIG. 6A.

At the instant t1, with the regenerative braking operation still activated, the valve 172 is then opened, while the valve 170 remains closed and the master cylinder 110 remains fluidically connected to the wheel brakes VL, VR, HL and HR. In order to avoid a hydraulic pressure loss at the wheel brakes VL, VR, HL and HR owing to the "fluidic short-circuit" with the unpressurised reservoir 120, the electromagnetic actuator 124 is actuated, likewise at the instant t1, in a suitable manner in order to feed hydraulic fluid from the master cylinder 110 into the brake circuits I., II. This is illustrated in FIG. 6B by the corresponding feed travel of the transmission spindle 138.

At the instant t2, the valve 172 is then closed again and the actuation of the electromechanical actuator 124 ends. Simultaneously, the fluid connection between the master cylinder 110 and the wheel brakes VL, VR, HL and HR remains open and the regenerative braking operation is activated. The brake force requested by the driver is therefore still realised by a first brake force fraction which is generated by means of the hydraulic pressure, and a second brake force fraction which arises from the generator braking force.

As illustrated in FIG. 6A, during the open period of the valve 172, the brake pressure at the wheel brakes VL, VR, HL and HR can be modulated (here increased), in order to fulfil a corresponding driver's wish (here for increasing the brake force). Thus, in spite of the "fluidic short-circuit" between the wheel brakes VL, VR, HL and HR, no loss of hydraulic pressure occurs during the open period of the valve 172. This proves that the electric motor 134 has sufficiently high dynamics, i.e. can be operated at sufficiently high rotational speed, to realise the required damming-up pressure at the open valve 172. Thus, during the entire regenerative braking procedure illustrated in FIGS. 6A and 6B, the wheel brakes VL, VR, HL and HR remain fluidically connected to the master cylinder 110 via the HCU 106. This is a desirable measure for safety reasons.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Method for operating a regenerative electrohydraulic motor-vehicle brake system having a master cylinder configured to be supplied with hydraulic fluid from a reservoir, an electromechanical actuator for actuating a piston accommodated in the master cylinder, and a shut-off valve provided between the master cylinder and the reservoir, comprising the steps of
actuating the electromechanical actuator with the shut-off valve being closed for generating a hydraulic pressure at a wheel brake that is fluidically connected to the master cylinder; and
activating a regenerative braking operation and actuating the shut-off valve for opening same, wherein the master cylinder remains fluidically connected to the wheel brake and the electromechanical actuator is actuated in order to at least partially maintain the hydraulic pressure at the wheel brake.

2. Method according to claim 1, wherein,
with the shut-off valve being open and with the master cylinder fluidically connected to the wheel brake, the hydraulic pressure is set by the relationship between a first fluid volume conveyed by means of the electromechanical actuator in the master cylinder and a second fluid volume escaping into the reservoir via the shut-off valve.

3. Method according to claim 1, wherein
the actuation of the electromechanical actuator with the shut-off valve being open and with the master cylinder fluidically connected to the wheel brake is effected in such a way that a damming-up effect is generated at a throttling point in a fluid connection between the master cylinder and the reservoir.

4. Method according to claim 1, wherein
the sum of a first brake force fraction generated by means of the hydraulic pressure and a second brake force fraction generated by means of the regenerative braking operation corresponds to a brake force requested by the driver.

5. Method according to claim 4, wherein
a modulation of the brake force requested by the driver is realized at least partly via a modulation of the first brake force fraction.

6. Method according to claim 4, wherein
a modulation of the brake force requested by the driver is realized at least partly via a modulation of the second brake force fraction.

7. Method according to claim 4, wherein
the brake system further comprises a mechanical actuator for actuating the piston, wherein the mechanical actuator comprises an actuating member coupled or couplable to a brake pedal and wherein the electromechanical actuator is actuated in such a way that a force transmission from the actuating member to the piston is prevented.

8. Method according to claim 7, wherein
the electromechanical actuator is actuated in such a way that a gap is maintained in a force transmission path between the actuating member and the piston.

9. Non-transitory computer-readable medium comprising instructions for performing the method according to claim 1.

10. Motor-vehicle control unit or control unit system, comprising the non-transitory computer-readable medium according to claim 9.

11. Regenerative electrohydraulic motor-vehicle brake system, comprising
a master cylinder configured to be supplied with hydraulic fluid from a reservoir;
an electromechanical actuator for actuating a piston accommodated in the master cylinder;
a first shut-off valve provided between the master cylinder and the reservoir; and
a control unit or control unit system, which is configured to
actuate the electromechanical actuator with the first shut-off valve being closed for generating a hydraulic pressure at a wheel brake that is fluidically connected to the master cylinder; and
activate a regenerative braking operation and actuate the first shut-off valve for opening same, wherein the master cylinder remains fluidically connected to the wheel brake and the electromechanical actuator is actuated in order to at least partially maintain the hydraulic pressure at the wheel brake.

12. Brake system according to claim 11, further comprising
a throttling point in a fluid connection between the master cylinder and the reservoir.

13. Brake system according to claim 12, wherein
the throttling point is formed by the first shut-off valve in the open state.

14. Brake system according to claim 11, wherein
a first overall flow resistance between the master cylinder and the wheel brake fluidically connected thereto is less than a second overall flow resistance between the master cylinder and the reservoir with the first shut-off valve being open.

15. Brake system according to claim 11, further comprising
a mechanical actuator for actuating the piston, wherein the mechanical actuator comprises an actuating member coupled or couplable to a brake pedal and wherein the electromechanical actuator is actuable in such a way that a force transmission from the actuating member to the piston is preventable.

16. Brake system according to claim 11, further comprising an electrical machine which is operable as a generator for the regenerative braking operation.

17. Brake system according to claim 11, wherein
the master cylinder is fluidically connected to a plurality of wheel brakes and in the fluid connection between the master cylinder and each wheel brake there is provided in each case at least one second shut-off valve, wherein the second shut-off valves are actuable in multiplex operation for realising a driving dynamics control.

* * * * *